Aug. 17, 1965  J. B. NIX  3,200,592
HYDRAULIC POWER SYSTEM
Filed March 12, 1964  3 Sheets-Sheet 3
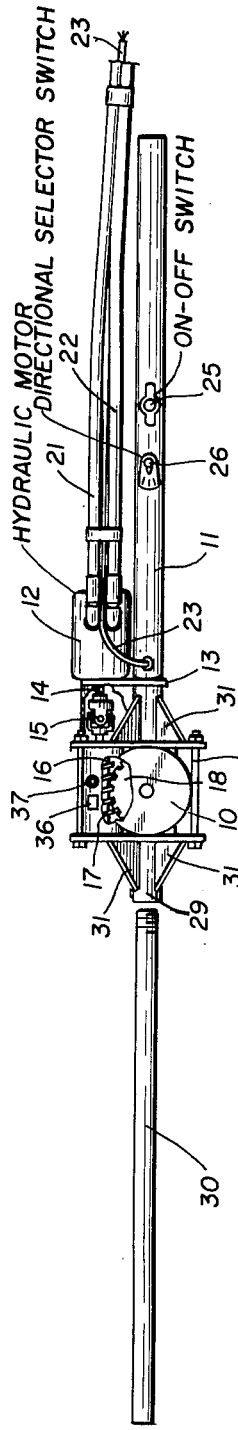
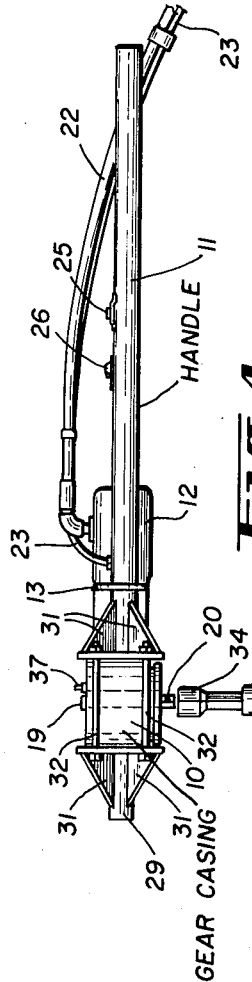
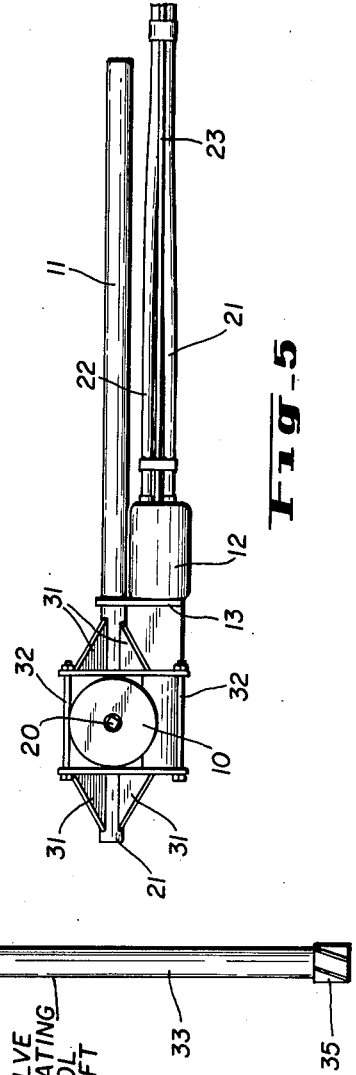
INVENTOR.
Joe B. Nix
Bertha L. MacGregor
ATTORNEY

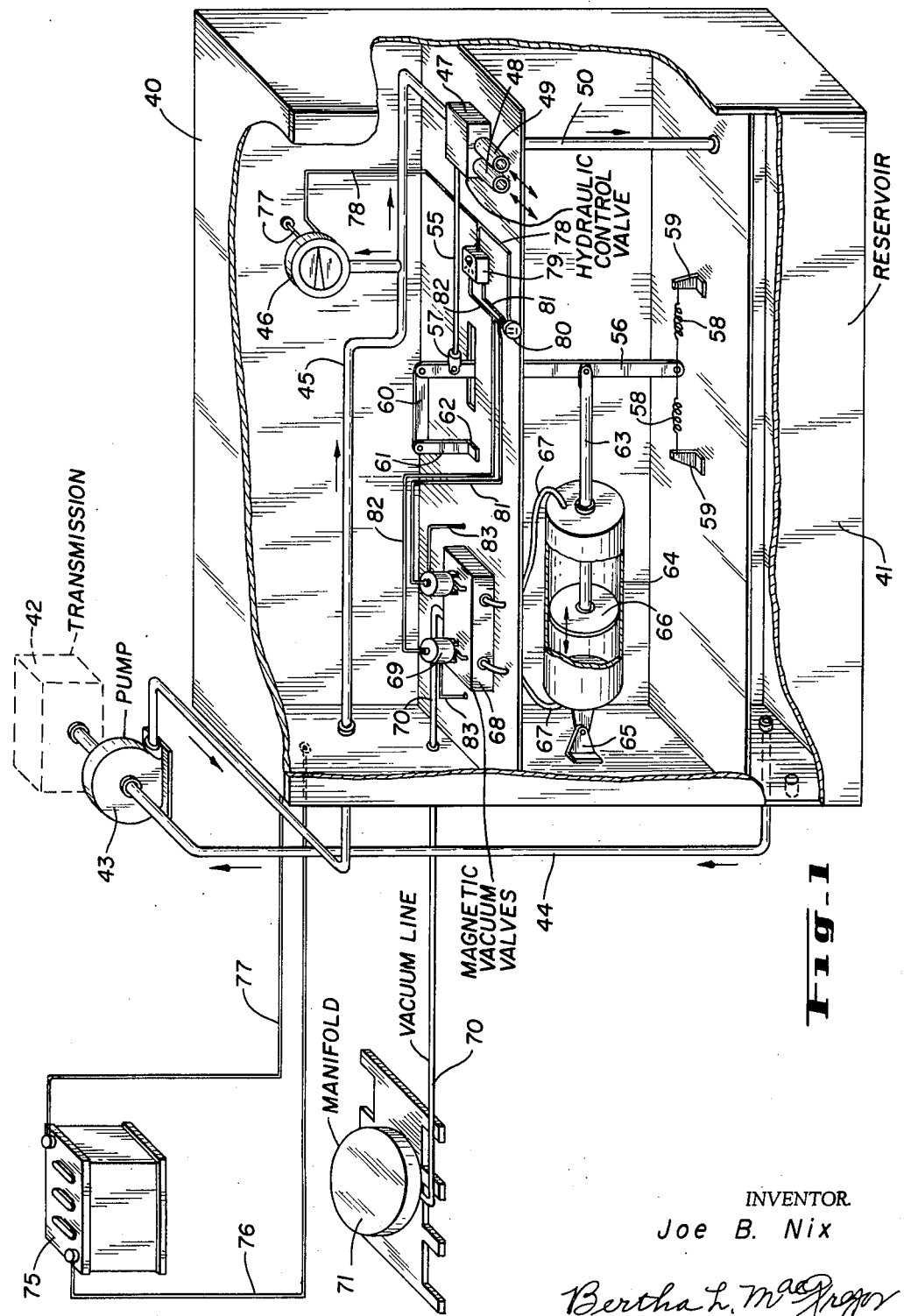

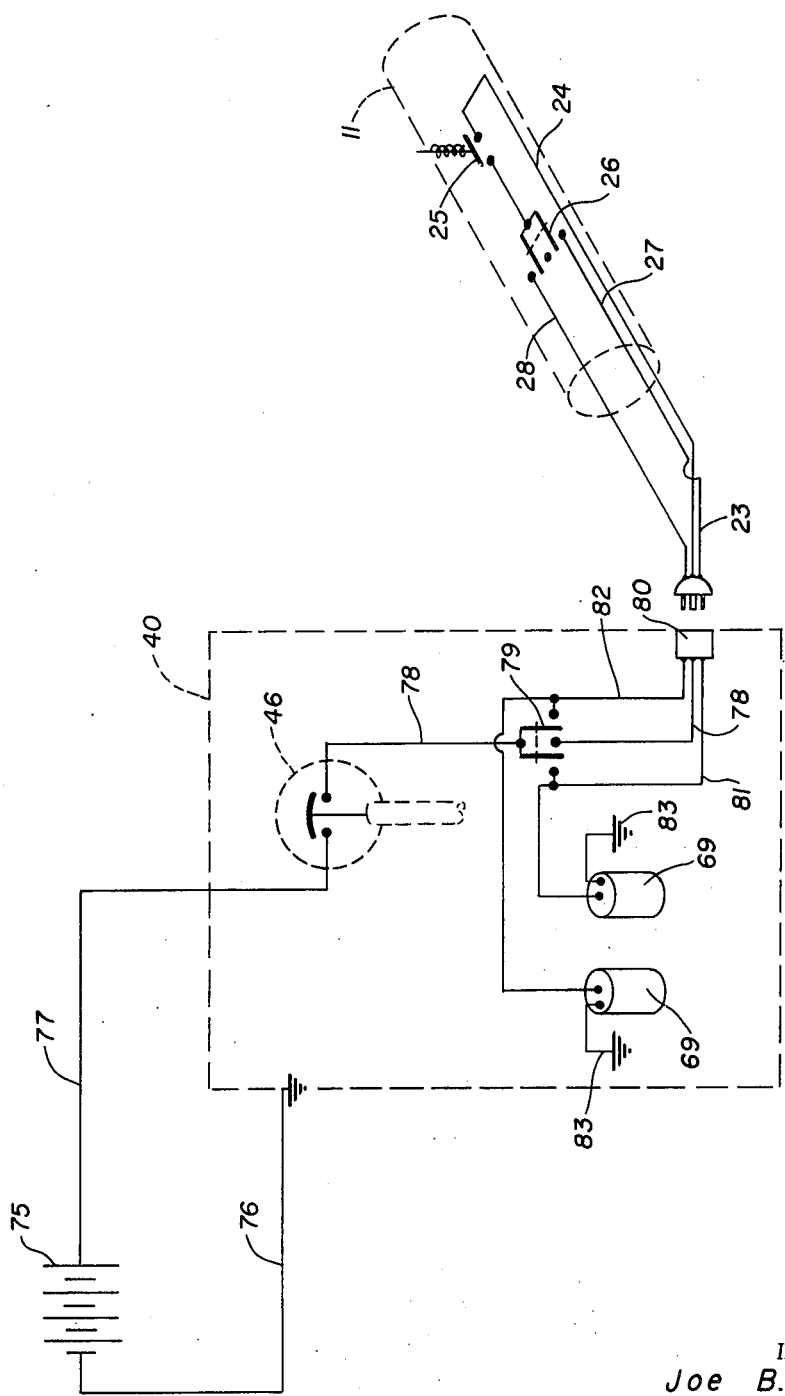

United States Patent Office

3,200,592
Patented Aug. 17, 1965

3,200,592
HYDRAULIC POWER SYSTEM
Joe B. Nix, 440 Scranton St., Pueblo, Colo.
Filed Mar. 12, 1964, Ser. No. 351,389
10 Claims. (Cl. 60—52)

This invention relates to a hydraulic power system which comprises a control unit and a portable hydraulically operated power unit detachably connected hydraulically and electrically to the control unit.

The main object of the invention is to provide a portable hydraulically operated power unit adapted for operating tools of various kinds, such, for example, as valve openers and closers, pipe threaders, and the like, which may be located at varying distances from the location of the control unit and the hydraulic supply.

Another object of the invention is to provide a control unit which comprises a hydraulic supply reservoir, hydraulic feed and return lines communicating with the reservoir, a pressure regulator in the hydraulic feed line, and a hydraulic control valve which includes bi-directional hose connections for quick attachment and detachment of the hydraulic hoses which are part of the portable power unit.

Another object is to provide, in a control unit of the character described, means for controlling the direction of rotation of the tool being operated by the portable power unit, said means including magnetic pick-up valves and vacuum valves operatively connected to the hydraulic control valve and to electrical switch means carried by the portable power unit.

Another object of the invention is to provide means for mounting the control unit on a motor vehicle, such as a truck, and to connect the hydraulic supply reservoir through its hydraulic feed line to a hydraulic pump driven by a power take-off connected to the truck transmission. Further, to connect the direction controlling means of the control unit to the vacuum system of the truck engine.

Another object of the invention is to utilize the truck battery to provide electrical current leading to the means in the control unit for controlling the direction of rotation of the tool being operated by the portable power unit; and leading also to a plug connection in the control unit for supplying electrical current to a pair of switches located on the portable power unit; one of said switches being an on-off push button switch and the other being a three position on-off-on directional selector switch. Thus the operator of the portable power unit may select the direction of rotation of the tool at the site of its use by manipulation of the electrical switch and thereby control the direction of flow of the hydraulic fluid between the control unit reservoir and the hydraulic motor which is part of the portable power unit.

Another object of the invention is to provide, in a portable power unit of the character described, means for counting the number of turns transmitted to the tool shaft. The provision of a turn-counter is of particular advantage when the power unit is employed to operate a tool for opening and closing valves such, for example, as those located in municipal water lines, which require different numbers of turns. For example, 6 inch water valves require 22 turns each for opening and closing, and 12 inch water valves require 42 turns each for opening and closing.

Other objects and advantages of the invention will become apparent from the drawings and following specification.

In the drawings:

FIG. 1 is an elevational front view of the control unit of my invention, part of the unit housing being broken away, showing diagrammatically a motor vehicle battery, transmission power take-off and truck intake manifold for vacuum source, each connected to parts of the control unit.

FIG. 2 is a schematic view of the electrical circuit used in the hydraulic power system of my invention.

FIG. 3 is a top plan view of the portable hydraulic power unit which is part of the system.

FIG. 4 is a side view of the unit of FIG. 3 together with a valve operating tool adapted to be operatively connected to said unit.

FIG. 5 is a bottom view of the portable unit.

In that embodiment of the invention shown in the drawings, and referring first to FIGS. 2-5, the portable power unit comprises a gear casing 10, to which is connected a hollow handle 11, a hydraulic motor 12 mounted on plate 13 connected to handle 11, said motor having a shaft 14 connected through a universal joint 15 to a worm shaft 16 on which is mounted the worm 17 in the gear casing 10. The worm 17 meshes with the gear 18 fixed on the vertical shaft 19 rotatably mounted in the gear casing 10 and terminating at its lower end in a squared drive lug 20 designed for snap-on connection with a tool to be operated by the portable unit.

A hydraulic pressure line 21 and return line 22 communicate with the hydraulic motor 12, and a three wire electrical current cable 23 extends into the hollow handle 11. The wire 24 is a positive lead connected to the on-off switch 25 and to the three position directional selector switch 26. The wires 27, 28, return to the control unit.

Opposite the fixed handle 11, the casing 10 is provided with a tubular extension 29 for connection to a detachable handle 30. Braces 31 and tie rods 32 reinforce the gear casing 10 and attached parts.

As shown in FIG. 4, the portable unit is adapted to rotate a valve operating tool which comprises a shaft 33, square socket 34 for snap-on engagement with the drive lug 20, and a valve engaging head 35. Other tools or adapters may be substituted for the one illustrated herein.

A turn-counter 36 is mounted in the casing 10 adjacent the worm 17, and is provided with reset means 37.

The hydraulic power unit shown in FIGS. 3-5 is freely portable. The lengths of the hydraulic lines 21, 22, and of the electrical cable 23 may vary, depending on the distance between the control unit on a motor vehicle and the site of the work to be performed by the power unit.

Referring to FIG. 1, 40 indicates the control unit housing, in the lower part of which is located a hydraulic supply reservoir 41. A motor vehicle transmission, indicated diagrammatically at 42, drives a pump 43 located in the feed line 44 for putting the hydraulic fluid under pressure as it passes to the line 45, provided with a circuit breaker type pressure regulator 46, to the hydraulic control valve 47 and bi-directional hose connectors 48, 49. The connectors 48, 49 detachably receive the pressure and return lines 21, 22, carried by the portable power unit heretofore described. The hydraulic return tube 50 extends from the valve 47 to the reservoir 41.

The mechanism located in the control unit housing 40 for controlling the direction of flow of the hydraulic fluid from the valve 47 to the hydraulic motor 12 of the portable unit (and consequently the direction of rotation of the worm 17, gear 18, shaft 19, and the tool driven thereby), comprises a push rod 55 connected at one end to the hydraulic valve 47 and at its other end to the valve actuator arm 56 by the pivotal connection 57. The actuator arm 56 normally is maintained in neutral position by the springs 58 and mounts 59, at its lower end. The upper end of the arm 56 is pivotally connected to links 60, 61, supported by any suitable mount 62.

The valve actuator arm 56 is pivotally connected between its ends to the rod 63 of a pull-push vacuum cylinder 64 mounted on the housing 40 by means 65. A piston 66 is fixed on the rod 63. The interior of the cylinder 64 communicates through flexible vacuum hoses 67 with magnetically operated vacuum valves 68. Magnetic pick-up valves 69 control the valves 68. The vacuum valves 68 are connected through line 70 to a vacuum source which may be the truck intake manifold 71. Energizing of one or the other of the valves 69 controls the direction of movement of the piston 66 in the cylinder 64, and of the actuator arm 56 and push rod 55 which causes the hydraulic control valve 47 to direct pressurized fluid into one of the hose connectors 48 or 49.

Electrical current is supplied from the truck's battery 75, grounded to housing 40 as indicated at 76. A positive lead 77 extends from battery to the hydraulic pressure regulator 46, then by wire 78 to the 3-position switch 79, to plug connection 80. Wires 81, 82, lead from the switch 79 to the plug connector 80 and to the solenoid cylinders of the magnetic pick-up valves 69, grounded as indicated at 83. At the plug connector 80, the wire 78 is connected to the positive lead 24, and wires 81, 82 are connected to the lines 27, 28 in the detachable cable 23.

When the portable power unit is not operatively connected to the control unit, through the hydraulic lines 21, 22, and through the electrical wires 24, 27, 28, the hydraulic hose connectors 48, 49 are capped.

The operation of the hydraulic power system is as follows: The vehicle motor is started, to energize the battery and thereby to send electrical current through the lines 77, 78, switch 79, to the plug connection 80, and through lines 81, 82, to the magnetic valves 69 of the direction controlling mechanism which actuates the arm 56 and rod 55 connected to the hydraulic control valve 47. Operation of the vehicle motor likewise drives the transmission, to operate the pump 43 and put the hydraulic fluid under pressure in the line 45 into the control valve 47 to the hose connectors 48, 49. The engine manifold 71 creates vacuum to operate the piston 66, and the parts 56, 55 and valve 47 actuated thereby.

As soon as the portable power unit is connected to the control unit by plugging the cable enclosed wires 24, 27, 28 into the plug connector 80, and by attaching the hydraulic hoses 21, 22, to the hose connectors 48, 49, the portable unit is ready for operation of a selected tool at a selected site which may be remote from the control unit.

After selecting the direction of rotation of the drive shaft 19 on switch 26, the portable power unit is made to operate by pressing down on the button of the switch 25.

The pressure regulator 46 may be set at selected pressure to prevent operation of the system at higher pressures which may result in injury to the valves or other parts being worked on by the portable power unit and tool.

In describing the invention, reference has been made to a particular example embodying the same, but it is to be understood that the invention is not limited to the construction shown in the drawings and that various changes may be made in the construction and general arrangement of parts without departing from the invention. Likewise, tools other than the tool 33–35 may be operated by the portable power unit, with or without the use of adapters between the unit and the tool.

It is most convenient to employ mobile means such as a motor vehicle engine, to supply electrical and mechanical means for operating the control unit and the portable hydraulic power unit of my construction; but obviously sources other than a truck battery, manifold and transmission may be utilized for the same purposes.

I claim:

1. A hydraulic power system comprising a control unit and a portable power unit,
said control unit comprising
   (a) a housing,
   (b) a reservoir in the housing containing a hydraulic supply,
   (c) hydraulic feed and pressure lines communicating with each other and with the reservoir,
   (d) a hydraulic pump connected in said lines,
   (e) a hydraulic control valve connected to the pressure line in the housing and provided with bi-directional hose connections,
   (f) mechanical and electrical means in the housing for actuating the hydraulic control valve to connect a selected one of said hose connections with said pump and the other hose connection with said reservoir,
   (g) a source of electrical current,
   (h) a positive lead connected to said source,
   (i) a pair of wires electrically connected to the positive lead and to the means for actuating the hydraulic control valve, and
   (j) a plug connector connected to the ends of said lead and pair of wires in the control housing,
said portable power unit comprising
   (k) a hydraulic motor,
   (l) mechanism driven by the motor,
   (m) a pair of hydraulic lines having ends communicating with the hydraulic motor and opposite ends arranged for quick detachable connection to the bi-directional hose connections in the control unit,
   (n) a direction selector switch on the portable unit,
   (o) an on-off switch on said portable unit,
   (p) electrical wires connected to said switches, and
   (q) a plug on the free ends of said wires for detachable connection to the plug connector in the control unit housing,
whereby said portable power unit hydraulically operates a tool located at varying distances from the control unit and source of hydraulic supply.

2. The hydraulic power system defined by claim 1, in which a pressure regulator is connected to the hydraulic pressure line between the pump and the hydraulic control valve, and the positive lead from the source of electrical current is connected to said regulator between the source and the connector plug in the control unit.

3. The hydraulic power system defined by claim 1, in which the means for actuating the hydraulic control valve to connect a selected one of said hose connections with said pump and the other hose connection with said reservoir comprises
   (a) a vacuum source,
   (b) a pair of vacuum valves connected to said vacuum source,
   (c) a pair of magnetic valves for controlling said vacuum valves,
   (d) a vacuum cylinder connected to said vacuum valves,
   (e) a piston and shaft reciprocable in the cylinder,
   (f) an actuator arm pivotally connected to the reciprocable shaft,
   (g) means for yielding maintaining the arm in neutral position, and
   (h) a push rod pivotally connected to the actuator arm and to the hydraulic control valve.

4. The hydraulic power system defined by claim 1, in which the mechanism driven by the hydraulic motor of the portable power unit comprises
   (a) a horizontal shaft rotated by the motor,
   (b) a worm on the horizontal shaft,
   (c) a vertical shaft,
   (d) a gear fixed on the vertical shaft in mesh with the worm, and
   (e) means on the vertical shaft for detachably engaging a tool to be operated by the portable power unit.

5. The hydraulic power system defined by claim 1, in which the portable power unit comprises
(a) a gear casing,
(b) a worm shaft in the casing,
(c) a universal joint connecting the worm shaft to the hydraulic motor,
(d) a gear meshing with the worm shaft,
(e) a tool driving shaft on which said gear is fixedly mounted, and
(f) a hollow handle connected to and extending horizontally from the gear casing,
(g) said direction selector switch and on-off switch being located in the handle and accessible exteriorly of the handle.

6. The hydraulic power system defined by claim 5, which includes a turn-counter mounted in the gear casing and operated by said worm shaft.

7. The hydraulic power system defined by claim 5, which includes a handle receiving extension on the gear casing axially aligned with the hollow handle connected to the gear casing, and a separate handle adapted to be connected detachably to said extension.

8. In combination with a motor vehicle provided with a battery and power transmission, a hydraulic power system which comprises,
(a) a control unit adapted to be carried by the vehicle,
(b) a hydraulic supply reservoir in the control unit,
(c) a hydraulic control valve provided with a pair of hose connections,
(d) means conveying hydraulic fluid from the reservoir to the control valve under pressure, said means including a pump operated by the vehicle power transmission,
(e) means in the control unit for actuating the control valve to connect one of said hose connections to pump and the other hose connection to the reservoir,
(f) electrical wiring connected to the battery and to said control valve actuating means,
(g) a connector plug on the end of said wiring,
(h) a portable power unit including a hydraulic motor,
(i) a pair of hydraulic conduits connected to the motor and having free ends adapted to be quickly detachably connected to said control valve hose connections,
(j) an electrical direction selector switch located on the portable unit, and
(k) electrical wiring connected to the switch and adapted to be quickly detachably connected to said connector plug in the control unit.

9. The hydraulic power system defined by claim 8, in which the means in the control unit for actuating the control valve to connect one of said hose connections to the pump and the other hose connection to the reservoir, comprises
(a) a vacuum source,
(b) a pair of vacuum valves connected to said vacuum source,
(c) a pair of magnetic valves for controlling said vacuum valves,
(d) a vacuum cylinder connected to said vacuum valves,
(e) a piston and shaft reciprocable in said cylinder,
(f) an actuator arm pivotally connected to the reciprocable shaft,
(g) means for yieldingly maintaining the arm in neutral position, and
(h) a push rod pivotally connected to the actuator arm and to the hydraulic control valve.

10. The hydraulic power system defined by claim 8, in which the portable power unit comprises
(a) a hydraulic motor,
(b) a horizontal worm shaft rotated by the hydraulic motor,
(c) a gear casing,
(d) a vertical shaft,
(e) gearing in the gear casing operatively connecting the horizontal and vertical shafts to transmit rotary motion to said vertical shaft, and
(f) a handle rigidly connected to the gear casing,
(g) said direction selector switch being located on the handle.

References Cited by the Examiner
UNITED STATES PATENTS

| | | | |
|---|---|---|---|
| 2,506,911 | 5/50 | Zeigler | 137—551 X |
| 2,596,532 | 5/52 | Coolidge et al. | 251—291 X |
| 2,656,679 | 10/53 | Morey | 60—52 |
| 2,925,253 | 2/60 | Long | 60—52 |
| 2,938,347 | 5/60 | Sturgis | 60—52 |

SAMUEL LEVINE, *Primary Examiner.*

JULIUS E. WEST, *Examiner.*